March 11, 1930.                    E. C. FRITTS                    1,750,220
                              MOTION PICTURE APPARATUS
                              Filed Aug. 22, 1924              3 Sheets-Sheet 1
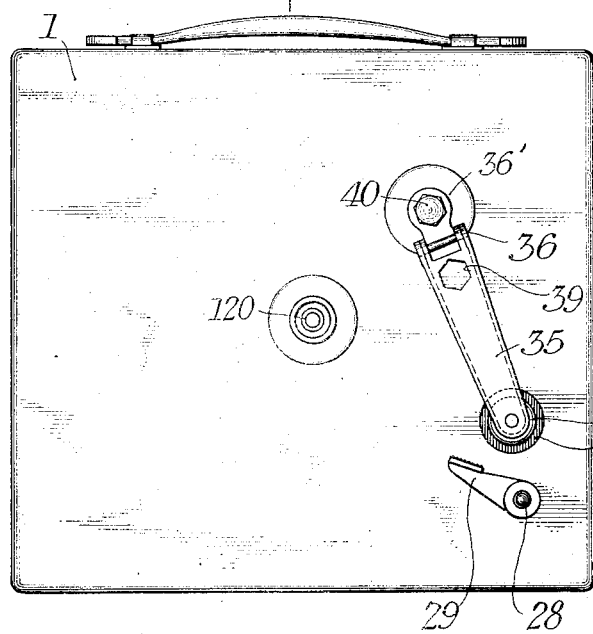
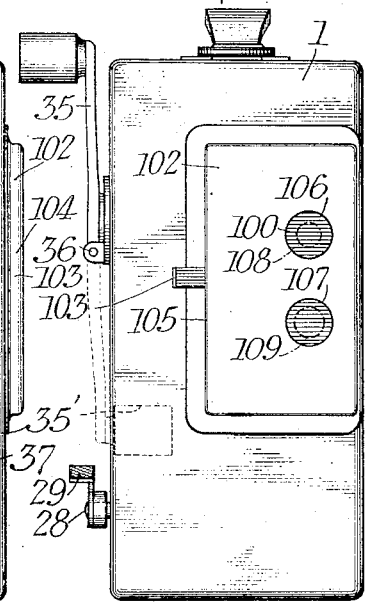
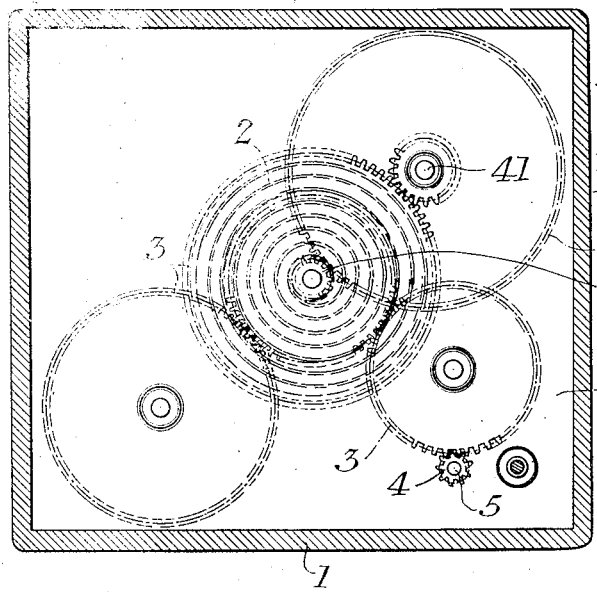
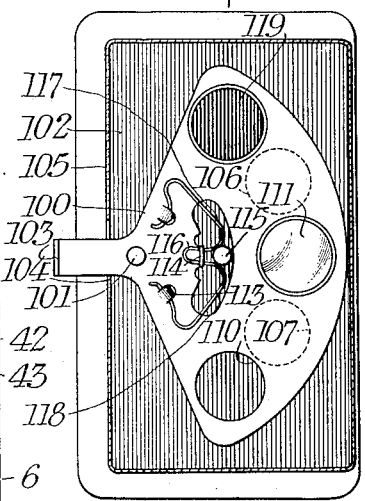
INVENTOR,
Edwin C. Fritts,
BY R. L. Stinchfield
N. M. Perrins
ATTORNEYS.

March 11, 1930.  E. C. FRITTS  1,750,220
MOTION PICTURE APPARATUS
Filed Aug. 22, 1924   3 Sheets-Sheet 2
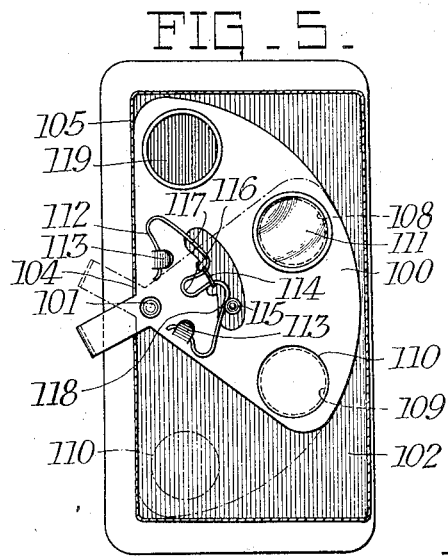
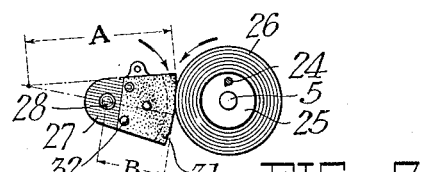
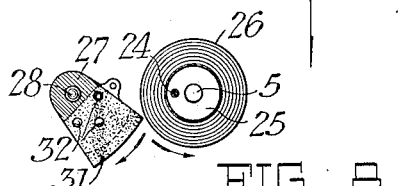
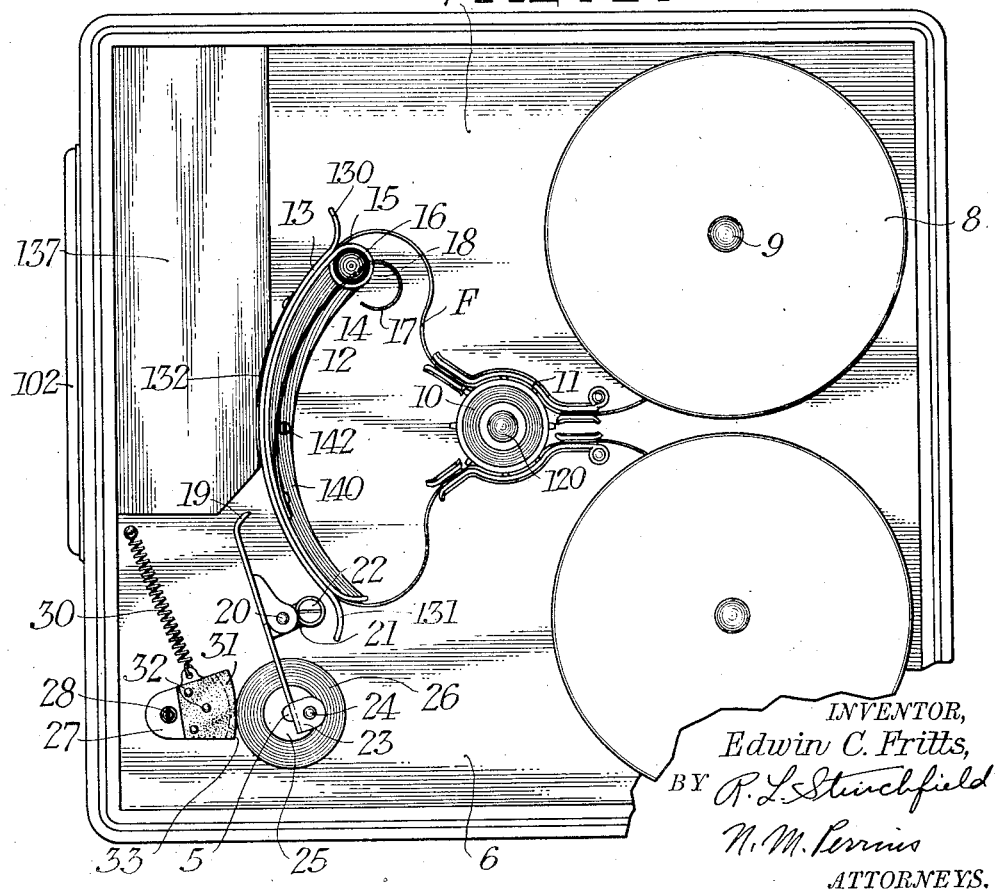
INVENTOR,
Edwin C. Fritts,
BY
ATTORNEYS.

March 11, 1930.  E. C. FRITTS  1,750,220
MOTION PICTURE APPARATUS
Filed Aug. 22, 1924  3 Sheets-Sheet 3
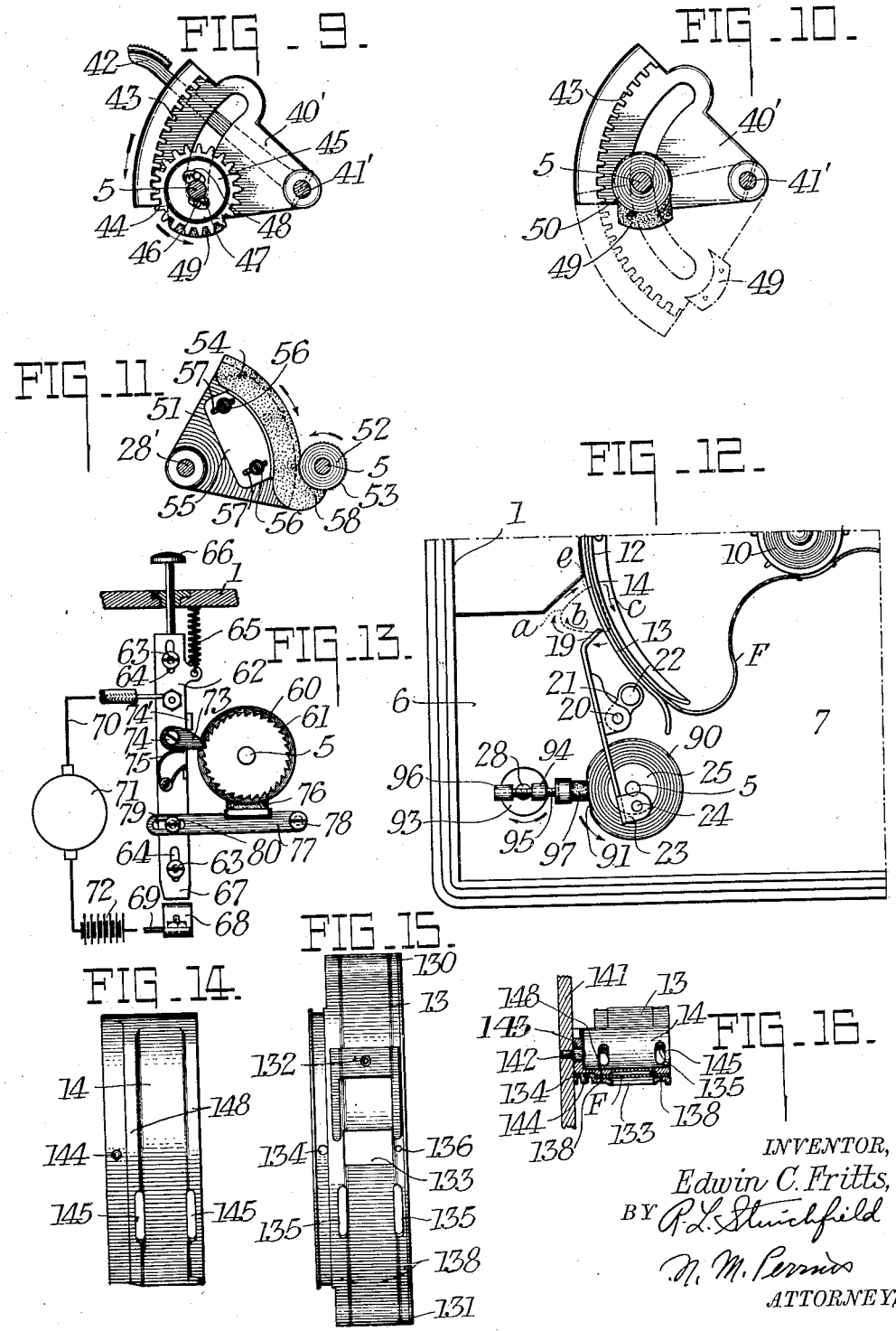
INVENTOR,
Edwin C. Fritts,
BY
ATTORNEYS.

Patented Mar. 11, 1930

1,750,220

UNITED STATES PATENT OFFICE

EDWIN C. FRITTS, OF ROCHESTER, NEW YORK, ASSIGNOR TO EASTMAN KODAK COMPANY, OF ROCHESTER, NEW YORK, A CORPORATION OF NEW YORK

MOTION-PICTURE APPARATUS

Application filed August 22, 1924. Serial No. 733,653.

My invention relates to improvements in motion picture apparatus and particularly to motor driven mechanisms. In such apparatus, and particularly in cameras of the small portable type where it is desirable to make the motors as small and as light as possible, it takes an appreciable time for the mechanism to attain full speed. One of the principal objects of my invention is to supply a motor-driven camera which is small and light and which attains full speed almost instantaneously.

I attain this and other objects by providing means for giving the mechanism an initial impulse, greater than that ordinarily supplied by the motor, sufficient to overcome its inertia. In the preferred form, this is shown as a member directly connected to the operating button that controls the starting of the motor and engaging a rotary part of the mechanism. The movement of the member gives the part an initial spin. Other objects and features of my invention will be apparent from the following description in connection with the claims appended thereto.

In the drawings, wherein like reference characters denote like parts throughout,—

Fig. 1 is a side elevation of a camera constructed in accordance with and illustrating one form of my invention;

Fig. 2 is a front elevation thereof;

Fig. 3 is a section showing certain parts of the gearing of the camera shown in Fig. 1;

Fig. 4 is an enlarged section through the light controlling shutter;

Fig. 5 is a view similar to Fig. 4 but with the shutter located differently;

Fig. 6 is a side elevation of the camera with the side removed, as for loading with film;

Figs. 7 and 8 are details showing my pulldown controller in different positions;

Figs. 9 and 10 show partly in elevation and partly in section a modified form of controller;

Fig. 11 shows a similar view of another modified form of controlling mechanism;

Fig. 12 is a fragmentary side elevation of another type of pulldown control;

Fig. 13 is a side elevation of a starter designed for an electric motor-drive camera.

Fig. 14 is an elevation of the rear member of the film guide;

Fig. 15 is an elevation of the front member of the film guide;

Fig. 16 is a section of the film guide.

Broadly this motion picture camera is a power-operated machine in which the power-driven pulldown mechanism is controlled by a hand lever outside of the camera.

The camera body 1 may be of the usual box type. In the type shown in Figs. 1 to 3 and 6 to 8, there is a spring motor 2 furnishing power through suitable gears 3, one of which 4 is carried by a shaft 5 extending through a wall 6 into chamber 7 in which the film F is loaded.

Referring to Fig. 6 the film F is drawn from the supply reel 8, mounted on shaft 9, through guide 11 and over sprocket 10. From the sprocket 10 the film passes in a loop through the curved guide 12 consisting of members 13 and 14, the latter part having a loop 15 encircling pin 16 upon which it may be slid axially when spring latch 17 carried by member 14 is released from seat 18 in the pin. The details of these members are shown in Figs. 6 and 14 to 16.

The member 14 has a flange 140 resting against the wall 141 of compartment 7, and a lug 142 on the wall engages a hole 143 in the flange and holds the member rigidly in place. Member 14 carries a lug 144 for positioning member 13 and slots 145 for the pulldown claws 19. The member 13 has curved ends 130 and 131 for guiding the film and an aperture 134 for engaging lug 144. It carries on its front surface a spring member 132 that engages the casing 137, which contains the objective and finder, and thus presses the member 13 resiliently toward member 14. It also has slots 135 for the claws, an exposure window 133 and a small aperture 136, the purpose of the latter being to print an identifying mark on the edge of the film. The members 13 and 14 have opposed guide ridges 138 and 148 that bear against the margins of the film F, leaving the central or exposure portion free from contact as shown in Fig. 16.

The guide is longitudinally bowed convex to the objective, this curvature preventing transverse buckling of the film. It has been found that the slight optical errors introduced into the field by the curvature at the exposure window are more than compensated for by the freedom from transverse buckle and the certainty with which the film is always held exactly in place.

A pulldown claw 19 is pivoted at 20 to a link 21 which in turn is pivoted upon a stud 22. The lower end 23 of the claw is pivoted at 24 to a disk 25 power driven from shaft 5. Disk 25 is preferably equipped with a flange 26.

The pulldown control consists of a member 27 carried by a shaft 28 passing through the camera body and terminating in a handle 29. Member 27 is held by a spring 30 in the normal raised position shown in Fig. 6. There is a fiber facing 31 which can yield somewhat under pressure attached to member 27 as by rivets 32 and having a friction face 33 adapted to engage flange 26. The radius of the face 33 is of a length A greater than the distance B from shaft 28 to the face 33; consequently, when moved in the direction of the arrow Fig. 7, it engages flange 26 with increasing friction and starts the pulldown operating; and when the parts are as shown in Fig. 8 the pulldown continues to rotate under the power of the spring motor. When at rest it acts as a brake, the effect of which is increased by movement of the parts.

It should be particularly noted here that the initial or starting movement — that of overcoming the inertia of the stationary parts and film and that of getting the motor up to speed — is manually assisted by the movement of the starter just described. By a firm quick pressure on handle 29 I have found that in a single frame, the machine will reach normal speed, so that usually not over a single frame is lost between different scenes. It is also particularly efficacious as a brake as the friction surface 33 is then moving against the part 26 in a direction contrary to the latter's movement and brings it to a quick stop but without injurious jarring, thus avoiding loss of film by "coasting" of the mechanism.

So long as handle 29 is held down with the parts as shown in Fig. 8 the machine will continue to function so long as spring 2 is under tension. For winding spring 2 there is a handle 35 hinged at 36 to a plate 36' loosely surrounding shaft 41 so that the handle may lie in an unfolded or inoperative position with the finger piece 35' lying within the recess 37. To wind up the spring 2, arm 35 is swung about hinge 36 so the polygonal recess 39 will engage the nut 40 carried by shaft 41; and by turning the arm 35 nut 40 will turn shaft 41, gears 42 and 43, thus tensioning the spring.

When it is desired to stop the camera, handle 29 is released, thus allowing spring 30 to draw up the friction pad 33 so as to contact with flange 26, thus frictionally engaging the flange and quickly causing the movement of the claw 19 to cease.

Member 33, therefore, constitutes both a manual starter to bring the pulldown quickly up to proper speed without undue strain on the parts, and at the same time constitutes a brake operating with a desirable mechanical advantage upon a moving part. A single handle 29 controls both the starting and stopping movements.

In Figs. 9 and 10 I have shown a modified form of pulldown controller. There is a segment 40' keyed to a shaft 41' which extends through the camera body so as to terminate in an operating handle 42. Segment 40 carries an arcuate rack 43, meshing with the teeth 44 of pinion 45. This pinion turns freely upon shaft 5 when turned against the direction indicated by the arrow, and will turn with the shaft, due to the clutch formed by rollers 46, spring 47 and cam slots 48, when turned in the direction indicated by the arrow. By depressing handle 42, shaft 5, which, as in the first described embodiment of my invention, carries the pulldown mechanism, is given a positive spin.

Segment 40' also carries a friction pad 49 which contacts with a flange 50 carried by shaft 5. When the parts are in the position shown in full lines in Fig. 10 the friction pad, by resting on flange 50 holds shaft 5 against movement. By depressing handle 42 to start the motor through shaft 5 the pad 49 is moved to the position shown in dash and dot lines, permitting the motor to run freely.

In Fig. 11 I show a modification of the starter mechanism shown in Figs. 7 and 8. Here the segment 51 is carried by a shaft 28' having a handle like that shown in Fig. 1. Shaft 5 carries a disk 52 which may have a knurled or serrated periphery 53. Segment 51 carries a leather facing 54 on a plate 55 adjustable by screws 56 and slots 57. The facing 54 has a hook-shaped end 58 engaging periphery 53 when the parts are at rest. By turning shaft 28' manually in the direction shown by the arrow the edge of member 54 gives disk 52 a rapid twirl causing shaft 5 to reach its maximum speed without unduly taxing the motor. It should be noted that by providing a disk 53 with the circumference of about the length of facing 54, the latter member will, by turning shaft 5 a full revolution, cause the pulldown to start rapidly.

If an electric driving motor is to be used, the starter may be similar to that in Fig. 13, where, as before, shaft 5 carries the pulldown mechanism together with a disk 60 and ratchet wheel 61. A switch arm 62 slides upon studs 63 which pass through slots 64; and a spring 65 normally raises the arm 62 and the push button 66 carried thereby. The end 67 of arm 62 makes a contact with member 68 thus completing a circuit through wires 69 and 70, motor 71 and battery 72. The downward movement of arm 62 causes latch 73 pivoted at 74 to the arm to engage and turn ratchet wheel 61 to overcome the inertia of the pulldown and associated parts. Latch 73 is limited in its movement upwardly by lug 74' and a spring 75 tends to hold the latch against the lug. A brake shoe 76 is carried by lever 77 pivoted at 78 to the camera and having a slot 79 engaging pin 80 carried by arm 62. Thus the brake is released as push button 66 is depressed.

In Fig. 12 still another form of my invention is illustrated. This form does not require the same force to be applied for the manual starting that is given by the above described forms of my invention, but nevertheless will quickly come up to speed due to the fact that the pulldown starts on its idle stroke and thus may gain speed before doing its work in moving film F.

The pulldown mechanism is like that already described, including claw 19 pivoted at 20 to link 21 which in turn is pivoted upon a stud 22. Pivot 24 passes through the lower end 23 of the claw and is carried by disk 25. This disk carries a flange 90 having a flat 91 on its periphery. The shaft 5 carries disk 25 and flange 90 and is power driven. In this instance shaft 28 carries a handle 29 on the exterior of the camera, as in the first embodiment above described. Member 93 is attached to the shaft and carries a threaded lug 94 through which a screw 95 adjustable by the knurled knob 96 by which the friction plug 97 is adjustably carried. This plug serves as a brake and contacts with flange 90, pressing on the periphery thereof, and stopping the rotation of the disk when the flat 91 is reached, the friction of plug 97 on the periphery of the disk, of course, first reducing the speed of rotation. In this form plug 97 serves almost entirely as a brake, an does not deliver as great a starting torque as in the other forms of my invention.

The flat 91 is positioned so that the claw 19 will come to rest in the position shown, first as it leaves the film F. The claw path is shown at a, and obviously the claw runs freely on its up stroke b and moves the film through that portion of its movement designated by c. It will thus be seen that when the claw is again started it runs freely until point e is reached so that the pulldown may gain speed before starting to move the film.

It will be seen that the motor will never be required to start with the film engaged and ready to be moved, but only with the claw idle and moreover in such a position that there is the greatest opportunity for the mechanism to get up to speed before the work of moving the film is undertaken.

Referring to Figs. 1, 2, 4 and 5 the camera is equipped with a shutter plate 100 which is for a threefold purpose: to act as a dust cover for the objective and the finder lens; to serve as a carrier for a supplementary lens for use in conjunction with the objective; and to serve as a carrier for a color screen which will, by coloring the image viewed in the finder, signal to the operator that the supplementary lens is axially aligned with the objective.

Shutter plate 100 should not be confused with the regular shutter, not shown, which is used to make the exposures. Plate 100 is pivoted at 101 to a casing 102 and carries an operating handle 103 projecting through slot 104 in the casing wall 105. There are two circular windows 106 and 107 in the casing 106, in alignment with the finder lens 108, and 107, in alignment with the camera objective 109. The shutter plate moves in a space between the windows and the lenses, and, when the handle is in the position shown in Fig. 2, both windows are closed by plate 100. In this position both the finder lens 108 and objective 109 are protected from dust and dirt when not in use.

When handle 103 is depressed—moved to the position shown in Fig. 5 from that shown in Fig. 4—an aperture 110 in plate 100 lies opposite the objective 109, and a supplementary lens 111 lies opposite the finder lens 108. A spring 112 held by a pair of lugs 113, 113 and lug 114 engages a pin 115 so as to frictionally retain the shutter plate in its central, upper or lower position according to whether pin 115 is engaged by the central spring loop 116 or by a side of the spring as 117 or 118.

If handle 103 is raised, a color filter 119, here shown as a red filter, although the color is immaterial so long as it can be readily perceived, is moved opposite the finder lens 108 and lens 111 is moved in alignment with objective 109. Obviously the finder image will be colored thereby, so that the operator will be automatically informed that the supplementary lens is in position for use. This is useful in preventing mistakes as to the optical equipment in use.

In the present instance the supplementary lens 111 is of the variety commonly known as a "portrait attachment", that is a weak positive lens which is used for making close up pictures with a fixed focus lens. Of course, this lens may be of any of the usual supplementary lens types such as a weak negative lens for "telephoto" pictures.

Finder systems are usually corrected very slightly, if at all, and the addition of a weak lens thereto merely changes the focal length to a degree not appreciable in the visual inspection of the field.

If, because of defect in the motor or of any other reason, it should be necessary or desirable to crank the camera directly by hand, the nut 40 and the handle are removed from shaft 41 and placed on the end of shaft 120. The hole 37 is placed equidistantly from shafts 120 and 41 so that the finger piece 35' can be positioned therein when the handle is inoperatively attached to either shaft. The structure of the handle 35 and the relation of the socket 37 to the shafts 120 and 41, as well as the particular form of the film guides 11, do not constitute a part of my invention.

It is to be understood that the various embodiments of my invention as herein described are by way of example and that numerous variations therein are possible. I contemplate as within the scope of my invention all such modifications and equivalents as fall within the terms of the appended claims.

Having thus described my invention, what I claim as new and desire to secure by Letters Patent is:

1. In motion picture apparatus, mechanism for advancing film including a member movable in a closed cycle, a motor for driving said mechanism, manual means for controlling the initiation of such driving, and a pivoted member with an arcuate yieldable engaging part automatically actuated, when the manual means is operated, to engage and move said movable member, the radius of curvature of the arcuate part being greater than the distance from such part to the pivot.

2. In motion picture apparatus, mechanism for advancing film including a rotary member, a motor connected to said mechanism for driving the same, manual means for controlling the initiation of such driving, and a pivoted member with an arcuate yieldable engaging part automatically actuated when the manual means is operated, to engage frictionally and turn said rotary member, the radius of curvature of said arcuate part being greater than the distance from such part to the pivot.

3. In a motion picture apparatus, a rotary member, a mechanism for moving film intermittently connected to and driven by said member, a motor connected to and driving said member, an element mounted for oscillation and having both a driving engagement and a braking engagement with said rotary member and operative when oscillated in one direction to apply a driving force in one direction to said rotary member and when oscillated in the reverse direction to apply a braking force directly to the same rotary member.

4. In a motion picture apparatus, mechanism for moving film intermittently including a rotary member, a motor connected to said member to rotate it in a predetermined normal direction, an element mounted for oscillation between two positions and normally spring pressed into one position, frictionally interengaging surfaces on the rotary member and the oscillatory member, said surfaces constituting a brake when the oscillatory element is in its normal position and constituting a driving connection moving the rotary member in its normal direction when the oscillatory member is moved away from its normal position.

5. In a motion picture apparatus, mechanism for moving film intermittently including a rotary member, a motor connected to said member to drive it with a continuous rotary motion, in a defined normal direction, an element mounted to oscillate past said rotary member and normally spring pressed in one direction, a brake carried by said element and engaging said rotary member directly when the oscillatable member is in its normal spring pressed position and thereby preventing movement of the mechanism, the rotary member and oscillatable element having interengaging parts whereby, when the element is oscillated to release the brake, it exerts a driving force on the member to rotate it in its defined normal direction.

6. In motion picture apparatus, an objective, two stationary guide members extending behind said objective and constituting a film guide, the front member having an exposure window in alignment with the objective and having a slot, and intermittently operative film advancing mechanism in front of said guide and adapted to engage film in the guide through the slot, both of the guide members being curved uniformly and continuously opposite and past both said window and slot.

7. In motion picture apparatus, an objective, two stationary guide members extending behind said objective and constituting a film guide, the front member having an exposure window in alignment with the objective and having a slot, and mechanism for advancing the film intermittently through the guide and comprising an arm having a claw movable in a closed cyle, the path of movement of the claw passing through the slot, both of the guide members being curved uniformly and continuously opposite and past both said window and slot, the mechanism being on the convex side of the guide.

8. In motion picture apparatus, mechanism for advancing film including a rotary part, a motor connected to said mechanism for driving the same, a single manually movable member having an oscillatory movement, a part thereof moving tangentially to said rotary part, said member, when at one end of its path, acting as a brake directly upon said rotary part and, when at the other end of its path, permitting the rotary part to turn freely, said member, during its movement from the braking position to the free position, engaging and turning the rotary part to give it an initial turn.

Signed at Rochester, New York, this 20th day of August, 1924.

EDWIN C. FRITTS.